No. 824,182. PATENTED JUNE 26, 1906.
F. KNOFF.
STAKE PIN.
APPLICATION FILED SEPT. 30, 1905.
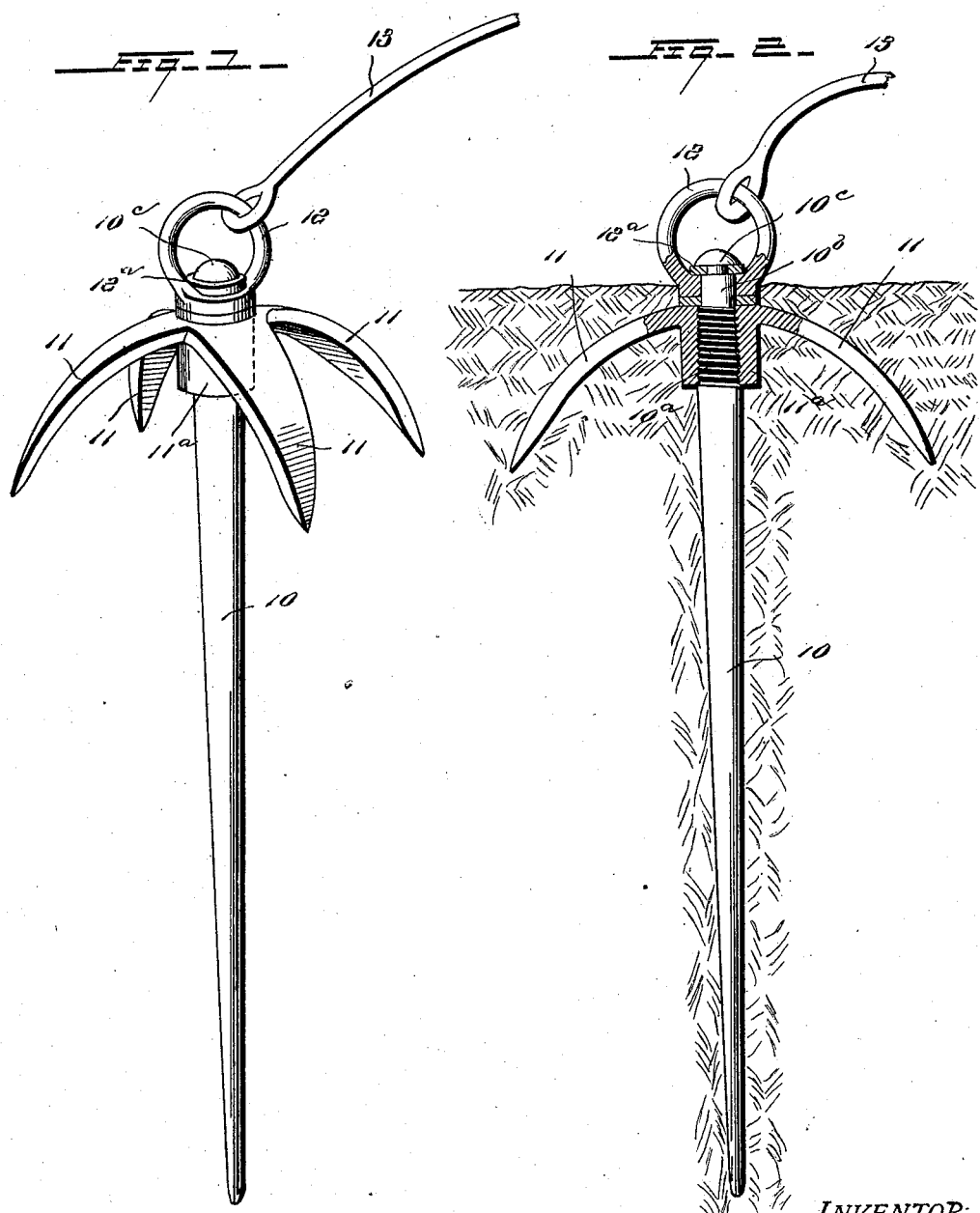

UNITED STATES PATENT OFFICE.

FRANK KNOFF, OF CHICAGO, ILLINOIS, ASSIGNOR OF ONE-HALF TO CHARLES H. TRYON, OF CHICAGO, ILLINOIS.

STAKE-PIN.

No. 824,182.  Specification of Letters Patent.  Patented June 26, 1906.

Application filed September 30, 1905. Serial No. 280,839.

*To all whom it may concern:*

Be it known that I, FRANK KNOFF, a citizen of the United States, residing at Chicago, in the county of Cook and State of Illinois, have invented new and useful Improvements in Stake-Pins, of which the following is a specification.

This invention is a stake-pin for tethering animals; and it consists of a pin having four curved prongs or blades at the upper end, and above the blades is a swiveled ring to which the rope for securing the animal is attached. The pin and prongs are driven in the earth, the ring being free to turn and permit the animal to move around without winding the rope.

In the accompanying drawings, Figure 1 is a perspective view of the device, and Fig. 2 is a sectional elevation showing the device inserted in the earth.

Referring specifically to the drawings, 10 is a pointed pin having a screw-threaded part $10^a$ and a stem $10^b$ at the top.

11 represents curved prongs or arms, preferably four in number, branching from a central nut $11^a$, which is secured firmly to the post 10 by being screwed on the threaded part $10^a$.

Mounted loosely on the stem $10^b$ is a swiveling ring 12, having a washer $12^a$ under the rivet-head $10^c$ of the stem $10^b$. The pin 10 and the prongs 11 are driven or buried in the ground with the ring 12 outside.

The animal is secured to the rope 13, the swiveled ring permitting it to go about without being tangled or wound up with the tethering device. The prongs assist in preventing the pin being pulled out of the ground.

What I claim as new, and desire to secure by Letters Patent, is—

1. A stake-pin provided with laterally and downwardly extending prongs near the top, arranged to be driven into the ground.

2. A stake-pin comprising a pin having a threaded part near the top and a plain stem above said part, a nut screwed on said threaded part and having laterally-extending arms, and a swiveled ring mounted on the stem.

In testimony whereof I have signed my name to this specification in the presence of two subscribing witnesses.

FRANK KNOFF.

Witnesses:
CLARA PROSCHE,
H. G. BATCHELOR.